UNITED STATES PATENT OFFICE.

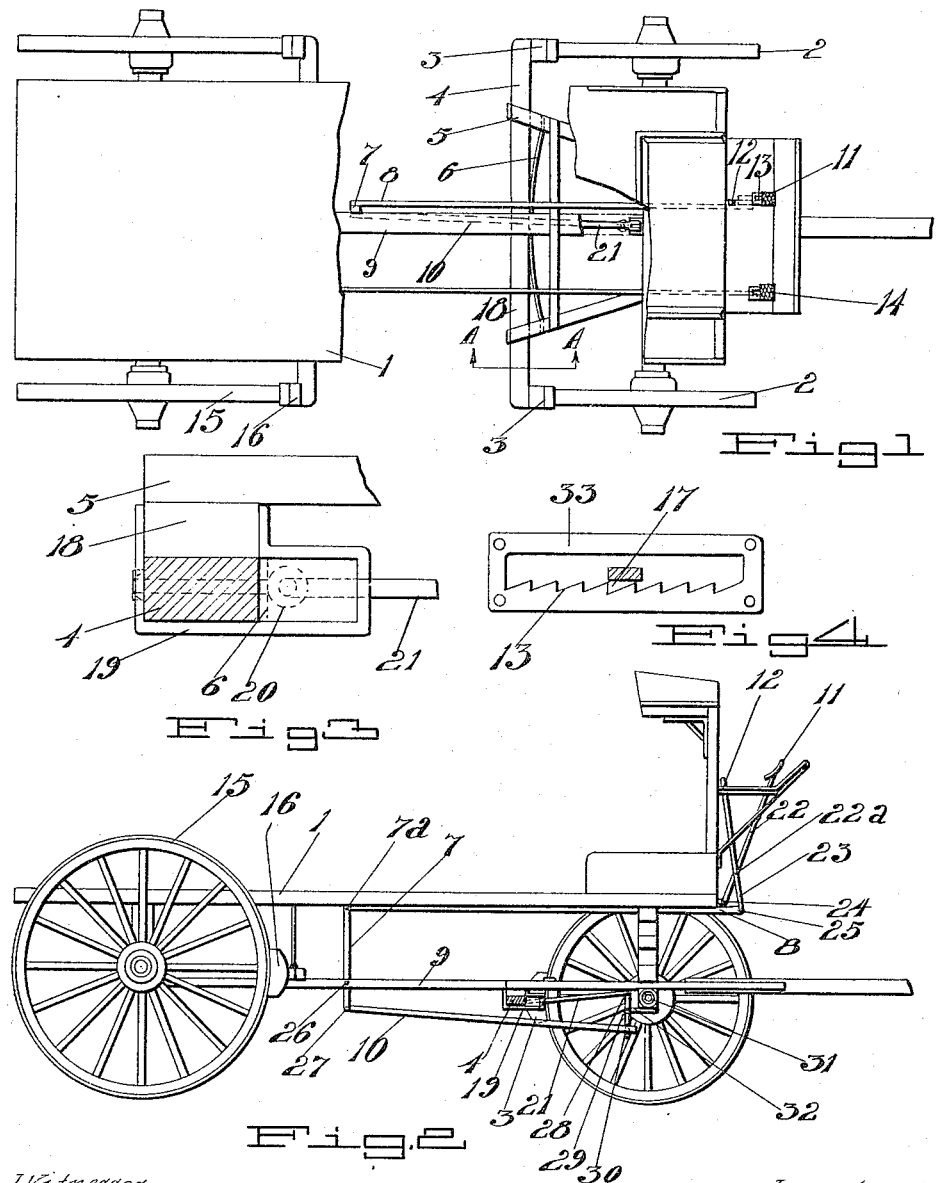

AUGUST JOHNSON, OF BORING, OREGON.

WAGON-BRAKE.

1,124,744.      Specification of Letters Patent.      Patented Jan. 12, 1915.

Application filed December 10, 1913. Serial No. 805,730.

*To all whom it may concern:*

Be it known that I, AUGUST JOHNSON, a citizen of the United States, residing at Boring, in the county of Clackamas and State of Oregon, have invented certain new and useful Improvements in Wagon-Brakes, of which the following is a specification.

This invention relates to an improvement in wagon brakes, and has for its object to provide a brake adapted for use on the front wheels of a wagon.

A further object is to provide a brake for mounting upon the running gears of a wagon and which is designed to swing horizontally with the front wheels thereof.

A still further object is to provide means for increasing the throw of the brake rod so as to bring the effective movement of the operating lever within convenient limits of movement of the foot of the operator.

I accomplish these objects by means of the structure illustrated in the accompanying drawing, in which—

Figure 1 is a plan view of a wagon, with portions broken away to show the front running gears. Fig. 2 shows a wagon, in side elevation, equipped with my improved brake showing one wheel and brake removed. Fig. 3 is a sectional view of the brake beam taken on the line A—A of Fig. 1. Fig. 4 is a detail view of a catch-bar.

Referring in detail to the numerals in the drawing, 1 designates the wagon body or platform usually employed on log wagons or, in lumbering, or the like, where heavy loads are drawn over steep roadways.

2 represents the front wheels of the wagon, and 3 are the brake blocks adapted for use thereon, each being supported upon a terminal of a brake beam 4 which is slidably carried in the elongated brackets or keepers 19 which are carried by a cross bar 18 attached to the lower sides of the rearwardly extended front hounds 5, and uniting the hounds at their ends, and passing beneath the reach 9 of the wagon.

In front of the brake beam is placed a convex leaf spring, the terminals of which bear in their corresponding brackets to yieldingly hold the brake normally in retracted position.

To the medial portion of the beam in the eye bolt 20 is secured the rod 21 which extends to and connects by means of pivot 28 with the bar 29, which is mounted by an intermediate point, upon the bracket 32 supported from the axle 31.

Connected to the lower end of bar 29 by means of a swivel connection, is a rod 10 extending well along the reach 9 where it is connected by means of pivot 27 with the vertical lever 7 which is pivoted on the pin 26 to the reach. This lever rises to the lower side of the platform 1, where it is connected by means of pin 7$^a$ with the brake rod 8. This rod extends beyond the front end of the platform where it is pivotally connected at 25 with the lever bar 23 which rises through the slot 12 in the floor of the driver's platform.

To a bracket 24 at the front of the platform 1, is pivoted a lever 22 which also is pivoted to the lever 23 at 22$^a$, whence it rises through the catch-bar 33 terminating in the foot rest 11. In operating this lever its motion is imparted to the lever 23 whose motion in turn is imparted to rod 8, whereby a short stroke of lever 22 will effect a comparatively long movement of the brake beam, so that the brakes may always be securely set by operating the lever within the range of its movement, when the catch 17 may be engaged in the teeth 13. A further brake 16 may also be employed upon the rear wheels 15, when it is found desirable or necessary.

By means of the structure shown a perfect brake mechanism is formed which is applicable on the front wheels.

The desirability for braking the front wheels lies in the fact that in logging and heavy teaming over steep roads, the braking of the rear wheels is not sufficient to hold the load. A further reason lies in the fact that when the rear wheels are made to slide they will "skid," on wet roads which is quite certain to result in disaster. The wheels will not skid while they are rolling. The front wheels are under the control of the team, and there is much less likelihood of danger from skidding of the front wheels.

Having described my invention what 1 claim is—

A wagon brake comprising in combination with a wagon, a keeper extending from the rear terminus of the front hounds thereof, a brake beam mounted transversely adjacent the front wheels, in said keepers and movable longitudinally therein, a vertical lever pivotally supported from the median portion of the front axle, a rod connecting the upper end thereof with the brake beam, a vertical lever pivoted to the wagon reach, a rod connecting said vertical levers by a swivel connection, a brake rod extending from the rear lever forwardly beyond the wagon body, and an operating lever connected to the brake rod and rising through a keeper in the body frame.

In testimony whereof I affix my signature in presence of two witnesses.

AUGUST JOHNSON.

Witnesses:
E. E. HECKBERT,
H. K. NICHOLS.